Figure 1:
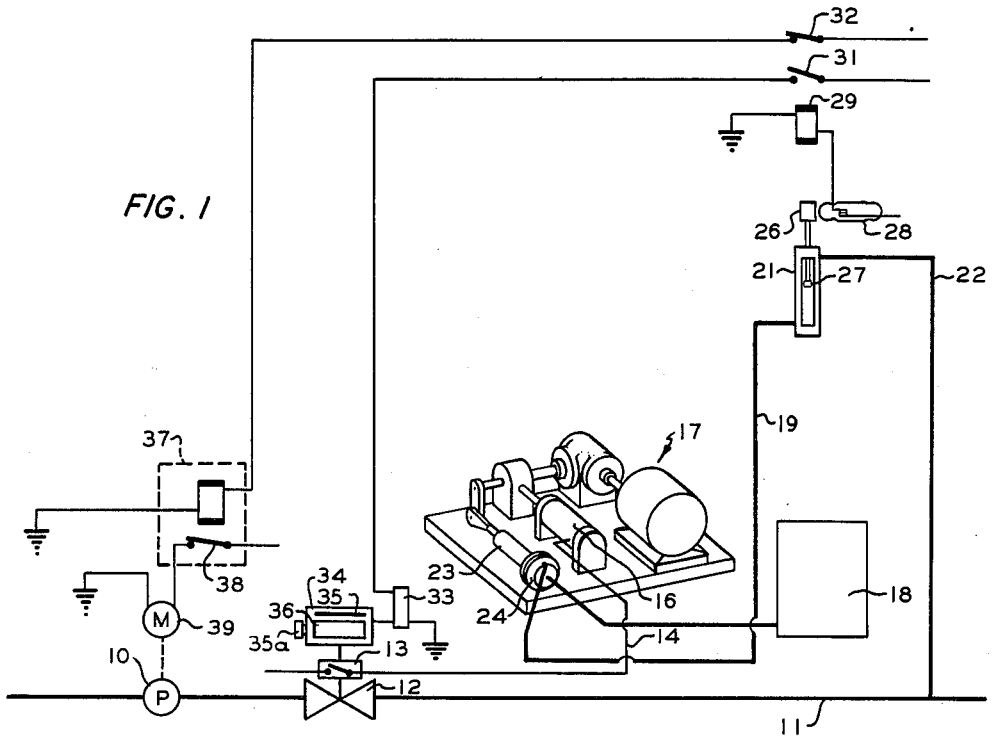

Nov. 9, 1965 W. D. LOVENDAHL 3,216,434
ADDITIVE INJECTION SYSTEM
Filed Jan. 2, 1962 2 Sheets-Sheet 1

INVENTOR.
W.D. LOVENDAHL
BY
Young + Quigg
ATTORNEYS

United States Patent Office 3,216,434
Patented Nov. 9, 1965

3,216,434
ADDITIVE INJECTION SYSTEM
Warren D. Lovendahl, Bartlesville, Okla., assignor to Phillips Petroleum Company, a corporation of Delaware
Filed Jan. 2, 1962, Ser. No. 163,703
7 Claims. (Cl. 137—9)

This invention relates to the injection of an additive into a flowing stream of fluid. In one aspect the invention relates to means for injecting an additive into a flowing stream of fluid and recording the amount of additive injected. In another aspect this invention relates to a method for injecting an additive into a flowing stream of fluid and recording the amount of additive injected. In another aspect this invention relates to means for recording and printing two separate measurements on a single ticket.

Recently self-service truck loading of petroleum products has been found to be useful in many instances to provide improved service for the distributor of the products and to provide operational economy for the supplier. Where the product is one which is odorized, it is necessary to provide reliable means for injecting metered amounts of the odorant into each delivery and it is very desirable to provide a permanent record of the odorant injection corresponding with each delivery of product. Further, it is advantageous to discontinue delivery of the product if the odorant injection is interrupted for any reason.

An object of this invention is to supply an additive to a flowing stream of fluid.

Another object of this invention is to inject an additive into a flowing stream of fluid and to record the amount of additive injected.

Another object of this invention is to inject an additive into a flowing stream of fluid, record the amount of additive injected, and automatically discontinue the flow of the stream if the additive injection stops.

Another object of this invention is to print a plurality of measurements on a single ticket in one operation.

Other aspects, objects and the advantages of my invention are apparent in the written description, the drawing and the claims.

According to my invention, means are provided for passing a flowing stream of fluid through a flow conduit, means to produce pulses at a rate proportional to the rate of flow of the stream, means to inject a predetermined amount of an additive into the stream for each pulse and means to detect and record each injection of the additive. In one embodiment of my invention, the means for producing pulses is an electrical switch driven by a meter in the flowing stream. The electrical pulses produced by this switch can be used to drive a solenoid-actuated injection pump. Suitable means for detecting and recording the additive injections include a pressure-sensitive switch responsive to the injection flow and counter and printing means actuated by electrical pulses produced by operation of the pressure switch.

Also according to my invention, a method is provided for injecting an additive into a flowing stream of fluid and recording the amount of additive injected by passing the fluid through a flow conduit, producing pulses at a rate proportional to the rate of flow of the stream, injecting an amount of the additive into the stream for each pulse, and detecting and recording each injection of additive.

Also according to my invention, the delivery of a fluid stream is discontinued through operation of a time delay relay when pulses from an additive injection stop.

Further according to my invention, means are provided for printing two separate measurements on a single ticket by actuating one printing counter by means of a solenoid-actuated indexing mechanism.

Figure 2:
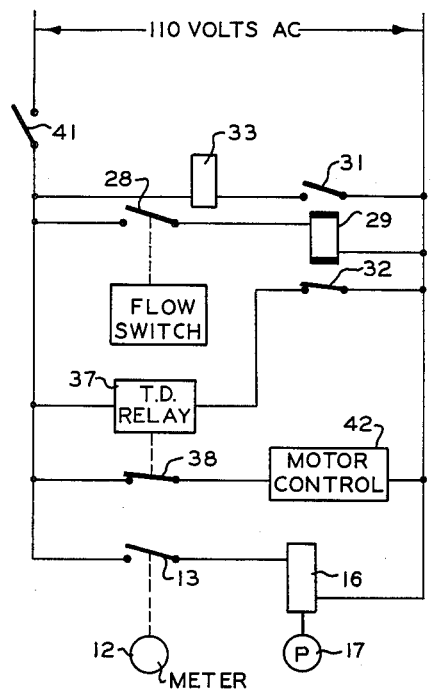
Figure 3:
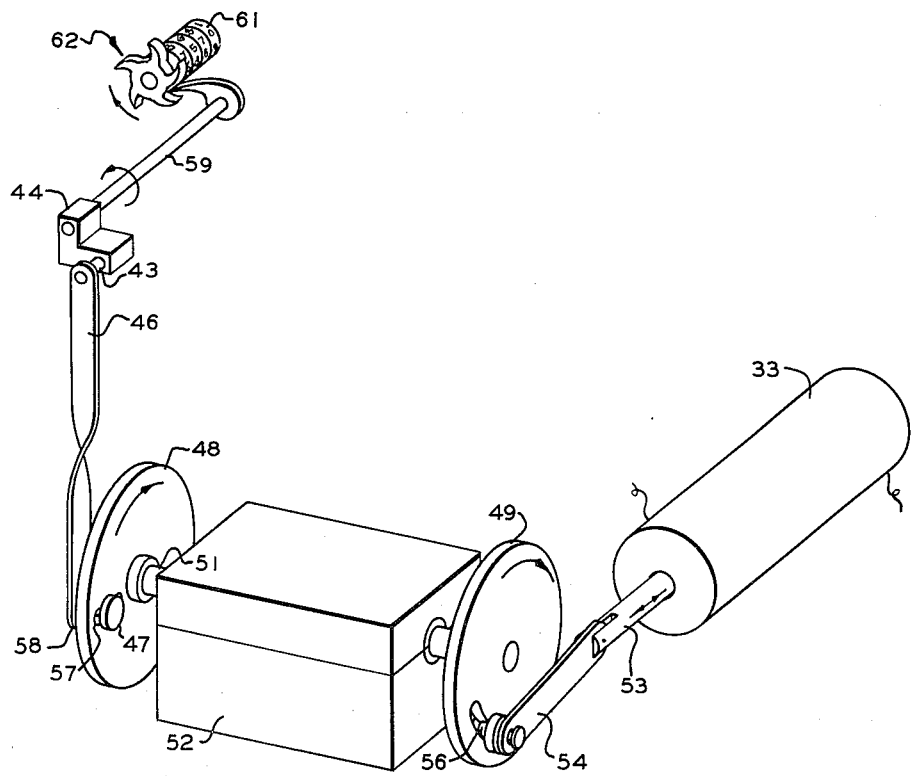

In the drawing, FIGURE 1 is a schematic representation of a complete additive injection system.
FIGURE 2 is a schematic circuit diagram.
FIGURE 3 is a diametric view of a portion of a printcounter embodying means for printing two separate measurements on a single ticket.

In the embodiment illustrated in FIGURE 1, a pump 10 forces a stream of liquefied petroleum gas through conduit 11 in which a positive displacement meter 12 is located. A pacing switch 13 is driven by meter 12 at a speed proportional to the rate of flow of the LPG in conduit 11. Each time switch 13 closes, a circuit is completed from a source of electrical energy (not shown) through the conductor 14 through solenoid 16. The energization of solenoid 16 actuates pump 17 to deliver a predetermined amount of an additive, for example ethyl mercaptan odorant, from odorant storage 18 through a suction line connected with storage 18 and pump 17, then through pipe 19, rotameter 21, and pipe 22 into conduit 11. A suitable apparatus for use as pacing switch 13 is the Type "C" transmitter manufactured by A. O. Smith Corporation, Smith-Erie Division, Erie, Pennsylvania, and illustrated in their Bulletin 185. A clutch-actuated flow control pump of the type manufactured by Milton Roy Company, Philadelphia, Pennsylvania, can be used to provide the combination of solenoid 16 and pump 17. Suitably the pump 17 includes a plunger 23 and a diaphragm pumping head 24, solenoid 16 actuating the clutch to drive plunger 23 for one stroke. Other types of solenoid or electrical impulse-actuated injection means are suitable for use as, for example, solenoid-actuated air piston pumps, etc. As illustrated in FIGURE 1, a rotameter 21 is provided with a magnet 26 attached to float 27, magnet 26 being arranged to actuate hermetically-sealed, magnetically-actuated switch 28. An assembly including rotameter 21, magnet 26, float 27 and switch 28 is available commercially, for example, a Brooks rotameter with magnetic alarm made by Brooks Instrument Company, Hatfield, Pennsylvania.

Other types of apparatus for actuating a switch responsive to the flow of additive from pump 17 to conduit 11 include, among others, various types of pressure-sensitive switches such as, for example, diaphragm switches, target or vane-actuated switches, and switches actuated by other types of flow-sensitive instruments such as orifices, meters, area meters, etc.

Switch 28 controls a circuit through the coil 29 of a relay which includes normally open contacts 31 and normally closed contacts 32. Contacts 31 control a circuit to a solenoid 33 which actuates means in a printing head 34 to record the odorant injection pulses. Suitably, printing head 34 is a Model 444, Type L6Y, printer attached to a Type C-2 meter sold by Neptune Meter Company, Long Island, New York, in which the ticket numbering printer dial, normally actuated by the operation of the printing platen, is connected with solenoid 33 so that this solenoid moves the dial one number for each injection of odorant.

Printing head 34 includes a printing mechanism (not shown), access to which is obtained by inserting a ticket to be printed in slot 35 and which is operated by knob 35a. In the operation of the particular printing head illustrated, the ticket is inserted at the beginning of a run, knob 35a turned to the rear, locating the ticket in the register and making an initial print, and the knob turned toward the front after delivery, thus printing the delivered amount of fluid and additive and permitting removal of the ticket.

Since the pump 17 injects a predetermined amount of odorant at each actuation, the number recorded by printing head 34 is representative of the number of odorant injections made and the amount of odorant injected.

Printing head 34 also has a visible dial 36 which shows the total amount of LPG which has passed through conduit 11, and this total is accumulated on another printing dial so that when a ticket is printed both the amount of LPG and the number of additions and thus the amount of odorant are recorded.

Normally closed contacts 32 control a circuit to a time relay delay 37. Contacts 38 of relay 37 are shown in a circuit to motor 39 which drives pump 10, although in most instances contacts 38 actually are in a starter control circuit for motor 39. When the starter circuit for motor 39 is energized, time delay relay 37 also is energized to start its time cycle running. If nothing else occurs in this circuit, contacts 38 are opened at the end of the period for which relay 37 is set. However, each time the circuit in which contacts 32 are placed is interrupted, relay 37 is reset to start its time period running again. Thus, as long as this circuit is interrupted repeatedly prior to the expiration of the time delay period, contacts 38 remain closed and motor 39 continues to run. However, if at any time contacts 32 remain closed during the complete time cycle, contacts 38 are opened and motor 39 and pump 10 stop, thus discontinuing the delivery of liquefied petroleum gas. This feature prevents the delivery of unodorized LPG since, if odorant is not delivered by pump 17, such as by failure of the supply from storage 18 or failure of the pump itself, contacts 32 are not opened since rotameter 21 is not actuated. A suitable relay of the type described for relay 37 is a Type HB–1533–XAX time relay delay manufactured by Heinemann Electric Company, Clinton, New Jersey. Alternatively, normally open contacts can be used at 32 and a relay 37 of the type of which contacts 38 are closed when relay 37 is energized and opened at the end of the time delay period and in which each energization of the circuit resets the time delay period can be used. This type of relay would permit motor 39 to continue to run as long as periodic energizations of the circuit are received while the type described permits motor 39 to run as long as periodic circuit interruptions are obtained.

The electrical circuit is illustrated schematically in FIGURE 2, wherein a switch 41 corresponds with a switch actuated by the truck operator desiring delivery from the self-service or key-stop installation. When switch 41 is closed, motor control 42 is actuated through contacts 38 to start the operation of motor 39 and pump 10 and thus begin delivery of the LPG through conduit 11. Each time contacts 13 are closed by rotation of meter 12, pump 17 is actuated by solenoid 16. Each time a surge of odorant flows through pipe 19, rotameter 21 and pipe 22, switch 28 is closed, completing a circuit through coil 29, thus closing contacts 31 and opening contacts 32. Closing contacts 31 completes a circuit through solenoid 33, thus actuating the printing dial (not shown) in printing head 34 to indicate one more injection pulse. Contact 32, on the other hand, opens, thus resetting time delay relay 37 to start its time cycle running again. This sequence of operation is continued until the truck operator obtains the desired amount of liquefied petroleum gas and switch 41 is opened to discontinue the operation of motor 39 and pump 10, thus stopping the entire operation.

FIGURE 3 shows details of a solenoid actuating mechanism applied to the Model 444, Type L6Y, printing head to modify this head to make it suitable for use as printing head 34 in FIGURE 1. Although in the schematic representation of FIGURE 1 solenoid 33 is shown outside the case of head 34, it is preferred that solenoid 33 be enclosed within the case to make a more compact and useful apparatus. In the unmodified head referred to above, in addition to the counter which normally records and prints the volume of fluid which passes through a meter such as meter 12, the measurement being transmitted by rotary motion from the meter to the head, a three-digit printing counter actuated by the ticket-printing mechanism (not shown) is provided. I have disconnected the actuating means of this counter from the printing mechanism and have provided means for activation of the counter by solenoid 33. Thus, the number of injections of the additive can be recorded and printed directly on the ticket with the amount of fluid dispensed through meter 12. The solenoid actuating mechanism in addition to solenoid 33 comprises a pin 43 attached to lever 44, a connecting arm 46 actuated by a pin 47 attached to wheel 48. Wheel 48 and wheel 49 are rigidly mounted on shaft 51 and a suitable bearing support 52 is provided for shaft 51. Wheel 49 is driven by plunger 53 of solenoid 33 and connecting rod 54 with an oscillating motion through pin 56 which is placed in an opening on the wheel. This drives wheel 48 with a similar motion. A pin 47 is adjustable in a slot 57 for variation of the stroke made by arm 46, and this can be accomplished by attaching pin 47 by means of screw 58. Lever 44, shaft 59, printing counter 61 and the pawl and ratchet actuating mechanism therefor, indicated generally at 62, are part of the unmodified printing head. It will be seen that each stroke of solenoid 33 actuates the mechanism to advance printing counter 61 one unit.

Although my invention has been described and finds particular utility in connection with the operation of a self-service, key-stop liquefied petroleum gas truck-loading installation, it also finds utility in other situations in which it is desired to make injections of an additive into a flowing stream and to detect and record these injections.

Reasonable variation and modification are possible within the scope of my invention which sets forth method and apparatus for injecting an additive into a flowing stream of fluid and providing a positive indication of the injection, and method and apparatus for automatic shutdown of a fluid delivery system when the injection of a desired additive ceases.

I claim:

1. Means for injecting an additive into a flowing stream of fluid and recording the amount of additive injected, comprising:
   a flow conduit;
   means to flow said stream through said conduit;
   a positive displacement meter in said conduit to measure the rate of flow of said stream;
   a switch actuated by said meter to produce electrical pulses at a rate proportional to said rate of flow;
   a solenoid-actuated pump having said solenoid energized by said pulses to inject a predetermined amount of said additive into said conduit for each of said pulses;
   means to detect flow of said additive and thereby to detect each injection of said additive and to complete an electrical circuit for each said injection; and
   a printing head having a first printing counter actuated responsive to said positive displacement meter to record the amount of flow of said stream and print said amount on a ticket and a second printing counter actuated responsive to the completion of said electrical circuit by said pressure sensitive means to record the number of such circuit completions and print said number on said ticket.

2. Means for injecting an additive into a flowing stream of fluid and recording the amount of additive injected, comprising:
   a flow conduit;
   means to force said stream through said conduit;
   means to measure the amount of flow of said stream;
   means to produce electrical pulses at a rate proportional to the rate of flow of said stream;
   means actuated by said pulses to inject a predetermined amount of said additive into said conduit for each of said pulses;
   means to detect flow of said additive and thereby to detect each injection of said additive; and
   a printing head having a first printing counter actuated responsive to said means to measure the amount of flow of said stream to record said amount and print said amount on a ticket and a second printing counter actuated responsive to said means to detect to record the number of such injections and print said number on said ticket.

3. A method for injecting an additive into a flowing stream of fluid and recording the amount of additive injected, comprising the steps of:
passing said fluid through a fluid conduit;
producing electrical pulses responsive to said flow of fluid at a rate proportional to said rate of flow;
actuating additive injection means responsive to said pulses to inject a predetermined amount of additive into said conduit for each of said pulses;
detecting and recording each initiation of flow of said additive thereby detecting and recording the number of such injections made; and
measuring and recording the amount of flow of said fluid and the number of injections of said additive and printing said amount and said number on a single ticket.

4. Means for injecting an additive into a flowing stream of fluid and recording the amount of additive injected, comprising:
a flow conduit;
means to force said stream through said conduit;
means to measure the amount of flow of said stream;
means to produce electrical pulses at a rate proportional to the rate of flow of said stream;
means actuated by said pulses to inject a predetermined amount of said additive into said conduit for each of said pulses;
means to detect flow of said additive and thereby to detect each injection of said additive and complete a circuit for each of such injections made; and
a printing head comprising means to record the amount of flow of said stream and the number of injections made and to print said amount and said number on a ticket, including:
a first printing counter actuated by rotary motion responsive to said means to measure the amount of flow of said stream;
a second printing counter actuated by a solenoid responsive to said circuit completions; and
means to cause said first and second counters to print simultaneously on a single ticket.

5. Means for injecting an additive into a flowing stream of fluid and recording the amount of additive injected, comprising:
a flow conduit;
means to flow said stream through said conduit;
a positive displacement meter in said conduit to measure the rate of flow of said stream;
a switch actuated by said meter to produce electrical pulses at a rate proportional to said rate of flow;
a solenoid actuated pump having said solenoid energized by said pulses to inject a predetermined amount of said additive into said conduit for each of said pulses;
means to detect flow of said additive and thereby to detect each injection of said additive and to complete an electrical circuit for each injection; and
a printing head to record both the amount of flow of said stream and the number of such circuit completions and to print said amount and said number on a ticket comprising:
a first printing counter actuated by rotary motion responsive to said positive displacement meter;
a second printing counter actuated by a solenoid responsive to said circuit completions by means of:
a first wheel;
a connecting rod connecting said wheel with the plunger of said solenoid;
a second wheel driven by said first wheel by means of a shaft connecting said wheel;
a connecting arm attached to said second wheel on a pin adjustable radially with respect to said second wheel;
means operatively connecting said connecting arm with said printing counter; and
means to cause said first and second printing counters to print simultaneously on a single ticket.

6. Means for injecting an additive into a flowing stream of fluid, recording the amount of additive injected and discontinuing flow of said stream when the injection of said additive ceases, comprising:
a flow conduit;
means to force said stream through said conduit;
means to produce electrical pulses at a rate proportional to the rate of flow of said stream;
a solenoid-actuated pump energized by said pulses to inject a predetermined amount of said additive into said conduit for each of said pulses;
flow sensitive means to detect each initiation of flow of said additive and thereby to detect each injection of said additive and to close a switch for each injection, thus completing an electrical circuit for each such injection;
means to record the number of completions of said electrical circuit and thereby to record the number of such injections made; and
means to shut down said means to force said stream through said conduit upon failure to actuate said pressure sensitive means for a predetermined period of time.

7. Means for injecting an additive into a flowing stream of fluid, recording the amount of additive injected, and stopping flow of said stream of fluid when injection of said additive fails, comprising:
a flow conduit;
a pump to force said stream through said conduit;
an electric motor to drive said pump;
means to produce electrical flow rate pulses at a rate proportional to the rate of flow of said stream;
a solenoid-actuated pump energized by said flow rate pulses to inject a predetermined amount of said additive into said conduit for each of said flow rate pulses;
flow sensitive means to detect each initiation of flow of said additive and thereby to detect each injection of said additive and to actuate a switch for each injection;
an electrical circuit containing said switch;
a relay in said electrical circuit;
a first contact actuated by said relay to record the number of injections made; and
a second contact actuated by said relay to transmit control pulses to control means for said motor, to stop said motor when the transmission of said control pulses ceases for a predetermined period of time.

References Cited by the Examiner

UNITED STATES PATENTS

| | | | |
|---|---|---|---|
| 1,957,167 | 5/34 | Hoffman | 101—90 |
| 1,959,501 | 5/34 | Ross | 222—38 XR |
| 2,427,418 | 9/47 | Rast | 101—90 |
| 2,530,682 | 11/50 | Coldsnow | 137—101.21 |
| 2,810,495 | 10/57 | Carriol et al. | 222—1 |
| 2,849,014 | 8/58 | Pressler | 137—98 |
| 2,872,072 | 2/59 | Reed | 222—133 XR |
| 3,099,366 | 7/63 | Reilly | 222—36 XR |
| 3,103,878 | 9/63 | Wetzer | 101—93 |

M. CARY NELSON, *Primary Examiner.*

LAVERNE D. GEIGER, *Examiner.*